United States Patent [19]

McGee et al.

[11] Patent Number: 5,329,089

[45] Date of Patent: Jul. 12, 1994

[54] PLASMA ARC WELDING WELD IMAGING

[75] Inventors: William F. McGee, Decatur; Daniel J. Rybicki, Huntsville, both of Ala.

[73] Assignee: The United States of America as represented by the United States National Aeronautics and Space Administration, Washington, D.C.

[21] Appl. No.: 98,918

[22] Filed: Jul. 29, 1993

[51] Int. Cl.[5] .................. B23K 10/02; B23K 9/095
[52] U.S. Cl. ..................... 219/121.45; 219/121.48; 219/121.54; 219/130.01
[58] Field of Search ............ 219/121.45, 121.46, 219/121.39, 121.59, 121.48, 121.54, 121.57, 75, 130.01, 132, 124.34

[56] References Cited

U.S. PATENT DOCUMENTS

| | | | |
|---|---|---|---|
| 2,832,881 | 4/1958 | Andriola | 219/75 |
| 3,275,795 | 9/1966 | Bosna et al. | 219/125 |
| 3,612,807 | 10/1971 | Liefkens et al. | 219/121.45 |
| 3,832,520 | 8/1974 | Glasser | 219/130 |
| 4,357,515 | 11/1982 | Kiefer et al. | 219/60.2 |
| 4,581,518 | 4/1988 | Takahashi et al. | 219/130.01 |
| 4,788,401 | 11/1988 | Kleppen | 219/121.48 |
| 5,180,921 | 1/1993 | Moreau et al. | 219/121.47 |

FOREIGN PATENT DOCUMENTS 0722707  1/1955  United Kingdom ............ 219/122

*Primary Examiner*—Mark H. Paschall
*Attorney, Agent, or Firm*—Robert L. Broad, Jr.; Guy M. Miller; John R. Manning

[57] ABSTRACT

A welding torch for plasma arc welding apparatus has a transparent shield cup disposed about the constricting nozzle, the cup including a small outwardly extending polished lip. A guide tube extends externally of the torch and has a free end adjacent the lip. First and second optical fiber bundle assemblies are supported within the guide tube. Light from a strobe light is transmitted along one of the assemblies to the free end and through the lip onto the weld site. A lens is positioned in the guide tube adjacent the second assembly and focuses images of the weld site onto the end of the fiber bundle of the second assembly and these images are transmitted along the second assembly to a video camera so that the weld site may be viewed continuously for monitoring the welding process.

5 Claims, 1 Drawing Sheet

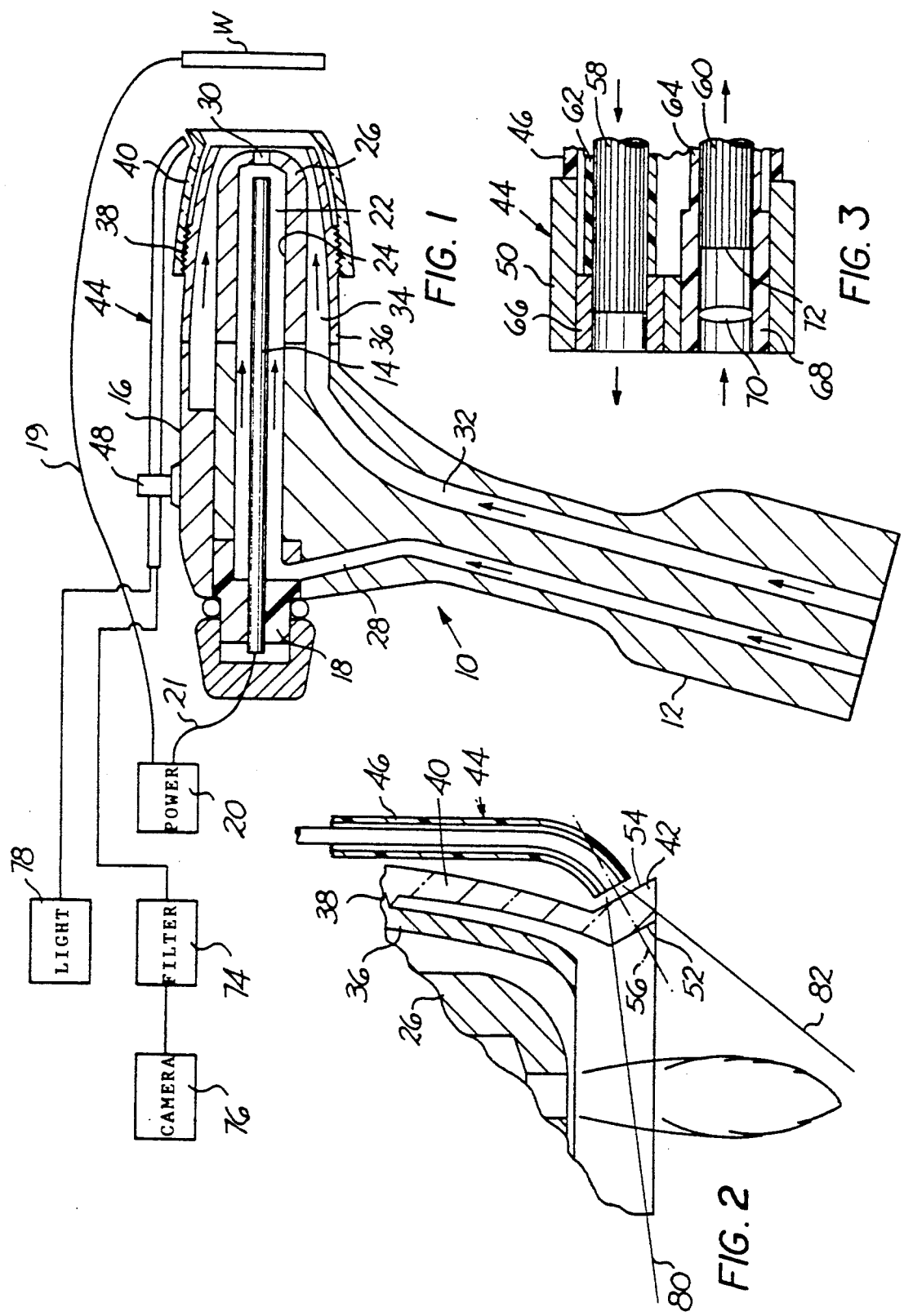

PLASMA ARC WELDING WELD IMAGING

ORIGIN OF THE INVENTION

The invention described herein was made in performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION (1) Field of the Invention

This invention relates to plasma arc welding (PAW), and more particularly to plasma arc welding apparatus having optical enhancement and monitoring of the location where the metal is being fused so that accurate, real time information is available for controlling the weld.

(2) Description of Related Art

Plasma arc welding is a process wherein coalescence of metals is produced by heating them with a constricted arc between a nonconsumable refractory electrode and the work or between the electrode and a constricting nozzle having an orifice. A filler metal may or may not be added during the process. Thus, plasma arc welding is a method of electrical arc welding in a protective gas wherein the arc is maintained between the workpiece and a nonconsumable electrode of a high melting point metal such as tungsten, the plasma of the arc being passed through a nozzle. The electrode is disposed within and insulated from a welding torch body and a front end having the constricting nozzle. An inert gas is supplied to the torch body and is channeled about the electrode exiting through the orifice. This gas acts upon the electric arc to constrict its shape to that of a narrow column and becomes ionized in the arc to form the plasma. In addition the orifice gas provides some shielding effect to the molten weld zone and the electrode. In most, if not substantially all, cases an auxiliary shielding gas is provided by channeling a second inert gas stream to blanket the area of arc plasma impingement on the workpiece to avoid contamination of the weld pool.

In plasma arc welding of certain ranges of metal thicknesses, certain combinations of plasma gas flow, arc current and weld travel speed will produce a relatively small weld pool with a hole, known as a keyhole, penetrating completely through the base metal. In a stable keyhole operation, molten metal is displaced to the top bead surface by the plasma stream to form the characteristic keyhole. As the plasma arc torch is moved along the weld joint, metal melted by the arc is forced to flow around the plasma stream and keyhole to a progressively lower temperature area at the rear where the molten metal is solidified. The motion of the molten metal and the complete penetration of the metal allows the impurities to flow to the surface and the gases to be expelled more readily before solidification. Orifice gas flow rates for PAW welding are critical and must be closely controlled in the keyhole mode.

The high density arc column in PAW in the keyhole and non-keyhole modes require accurate alignment between the weld torch and the joint seam to assure weld joint integrity. Structures and vessels fabricated with this process require high tolerance in joint fit-up and rigid tools for maintaining critical alignment of the parts during the weld process. Monitoring the process is a full time task by either a welder at the torch or at a remote location using a video monitor. Current systems in use and in the development stages utilize various methods to locate the weld joint seam. These methods can be inaccurate and easily rendered unreliable resulting in costly errors.

SUMMARY OF THE INVENTION

Consequently, it is a primary object of the present invention to provide accurate information for use in monitoring plasma arc welding processes from images collected at the leading edge of the weld pool and weld arc initiation point.

It is another object of the present invention to provide apparatus for a plasma arc welding torch for viewing the weld pool during the plasma arc welding process so that the weld joint seam may be revealed continuously and clearly during the initial or keyhole pass and coincidence with the initial pass may be obtained during a subsequent pass.

It is a further object of the present invention to provide an optically clear torch shield cup on a plasma arc welding torch together with an image guide and a light source so that clear visual data of the weld as it is being formed may be obtained and the welding process may be optimally controlled.

Accordingly, the present invention provides plasma arc welding apparatus including a welding torch having an optically clear torch shield cup surrounding the constricting nozzle and thus the arc emitted from the torch, together with a guide tube extending externally from the torch carrying first and second assemblies of optical fibers, the first assembly transmitting light from a source through a portion of the shield cup onto the weld pool and the second assembly having an image formed thereon by a lens from light received from the weld pool and transmitting the images to monitoring devices for monitoring the process. The shield cup includes an optic port at a lower edge to provide distortion-free transmission of light from the weld to the lens, the port being constructed to provide minimal reflections. The images which are formed by the lens on the optical fibers of the second assembly are preferably transmitted to a remote location for real time process control.

BRIEF DESCRIPTION OF THE DRAWINGS

The particular features and advantages of the invention as well as other objects will become apparent from the following description taken in connection with the accompanying drawings in which:

FIG. 1 is a cross sectional view of a manual plasma arc welding torch head incorporating weld imaging apparatus constructed in accordance with the principles of the present invention;

FIG. 2 is an enlarged fragmentary cross sectional view of the outlet end of the torch illustrated in FIG. 1; and FIG. 3 is an enlarged sectional view of the imaging end of the light guide tube illustrated in FIGS. 1 and 2.

DESCRIPTION OF THE PREFERRED EMBODIMENT

Referring to the drawings, a typical manual plasma arc welding torch 10 incorporating the principles of the present invention is illustrated in FIG. 1, the torch having a handle 12 for holding by an operator. Torches for mechanized and automated plasma arc welding apparatus are similar to manual torches except for the handle portion and are particularly intended to be included within the scope of the present invention.

The torch 10 includes a high temperature melting point electrode 14, such as tungsten, secured within the body or head 16 of the torch by means of an insulated collet 18 so that the electrode is insulated from the body. Electrical power, either alternating current or direct current, may be supplied from a source 20 through electrical leads 19, 21 between the workpiece W and the electrode as is conventional. A plenum chamber 22 is formed within the torch head spaced between the electrode 14 and the inside wall 24 of a constricting nozzle body 26, generally formed from copper alloy. The plenum chamber communicates with a passageway 28 extending through the body of the torch and the handle 12. An inert gas such as argon is supplied to the passageway 28 and flows into the plenum chamber 22 about the electrode to provide a protecting atmosphere and exits the nozzle body 26 through a small orifice 30 in the front of the electrode. As the orifice gas passes through the plenum chamber 22 it is heated by the arc, expands and exits through the nozzle orifice 30 at an accelerated rate. The arc is columnated into an extremely dense energy source and focused by the constricting nozzle on a relatively small area of the workpiece W. This gas, known as the orifice gas, supplies the necessary atmosphere for allowing electrical transfer of the arc across the gap between the electrode and the workpiece, and becomes ionized in the arc to form the plasma which issues from the orifice as the plasma jet.

Another passageway 32 is formed within the torch body 16 and the handle 12 and communicates with a chamber 34 formed between the nozzle body 26 and an outer wall or cup 36. The passageway 32 is supplied with a shielding gas, which may be an inert gas, such as argon, to blanket the area of arc plasma impingement upon the workpiece to provide a total inert atmosphere at the weld zone to prevent contamination. Although not illustrated, a coolant such as water may be circulated through the torch to cool and dissipate the heat generated in the constricting nozzle.

Secured to the outer wall or cup 36 by means of a threaded adapter 38, preferably formed from metal, is an optically clear transparent shield cup 40 constructed from fused quartz glass, the adapter being bonded to the shield cup by conventional means. If desired, the shield cup 40 may form or be substituted for the outer wall 36. In either event the shield cup 40 extends forwardly of the nozzle body 26 and the outer wall or cup 36 to permit visual access to the weld location and includes an outwardly projecting lip 42 which is highly polished to form an optic port at a lower edge of the cup.

Disposed adjacent the exterior surface of the lip or optic port 42 is one end of a guide tube 44 having an elongated flexible tubular sheath 46 which may be an articulatable woven metal or an elastomeric material which extends along the exterior of the torch head 16 and may be attached thereto by a bracket 48 or the like. The sheath is bent so that the leading end of the guide tube is closely adjacent the lip 42, the leading end of the tube preferably being a metallic collar 50. The lip 42 has a pair of spaced surfaces 52, 54 which are parallel to one another and substantially perpendicular to the axis 56 of the collar 50 so that reflections off of the surfaces 52, 54 are minimized.

Positioned within the sheath 46 and the collar 50 are two assemblies of conventional optical fiber bundles 58, 60 which are located within respective elongated sleeves 62, 64 within the sheath 46 and smaller sleeves 66, 68 within the collar 50. If desired an inert gas for cooling the fiber bundles may be directed through the guide tube 44 around the bundles. Also disposed within the sleeve 68 spaced from the optical fiber bundle 60 is a lens 70 having a focal plane which forms an image on the surface 72 at the end of the bundle 60, the image being transmitted through the fiber bundle preferably to a filter 74 and from the filter to a video camera 76 for monitoring the process. The other optical fiber bundle 58 transmits light from a strobe light 78 which preferably generates light of a different wavelength than that emitted by the arc of the torch 10. Thus, the bundle 58 guides and transmits light to the weld site while the bundle 60 guides and transmits the images from the weld site to remote weld monitoring apparatus and control systems which may function for real time process control especially for automated welding systems. The anticipated field of view illustrated between the lines 80 and 82 should provide a useful view of the optimum location for imaging information relevant to the weld for such control.

Accordingly, the present invention provides apparatus for obtaining and processing images collected at the leading edge of the weld pool and arc weld initiation point. This edge is always visible in the keyhole welding mode since the major masses of molten metal are not present at the leading edge of the keyhole and the actual joint seam is revealed continuously and clearly. Thus, torch alignment with the joint seam can be readily maintained by identifying and following the actual seam. Second pass weld imaging should provide a method to control and document coincidence with the initial pass and control other critical weld parameters. Additionally, the potential exists to further optimize the plasma welding process by intimately controlling the high density arc column and the energy output. Such process enhancements should create a condition where a near perfect bead profile is obtainable without requiring rotation of the welding torch, and the plasma arc output energy may be harnessed to a maximum.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. Plasma arc welding apparatus comprising a torch including a housing for supporting an axially extending annular nozzle body having an orifice at a front end, a plenum chamber formed within the nozzle body, an axially extending electrode disposed within said chamber spaced rearwardly of said orifice, means for supplying electricity to said electrode to form an arc exiting through said orifice, means for supplying an inert gas to said chamber for exiting said orifice with said arc for impinging at a weld site on a workpiece spaced from said orifice, an annular transparent shield cup having a mounting portion fastened to said housing and a free end disposed about said nozzle body, a guide tube extending externally of said housing, said tube having a free end adjacent to and directed toward a portion of said shield cup at a location for viewing said arc and weld site through said shield cup, first and second assemblies of optical fiber bundles disposed within said guide tube, each of said first and second assemblies having one end adjacent said free end and a second end, light generating means for applying light to said second end of said first of said assemblies for transmission of said light to said free end for illuminating said weld site, a lens disposed within said tube for forming images of said weld site on said one end of said second of said assemblies for transmission to the second end of said second assembly, and means for receiving and displaying aid images from the second end of said second assembly.

2. In plasma arc welding apparatus as recited in claim 1, wherein said shield cup includes a polished lip at a portion of said free end extending outwardly from said torch intermediate said arc and said free end of said tube, and said free end of said tube is positioned adjacent said lip for viewing said site through said lip.

3. Plasma arc welding apparatus as recited in claim 2, wherein said lip includes spaced apart substantially parallel surfaces.

4. Plasma arc welding apparatus as recited in claim 1, wherein said means for receiving and displaying comprises a video camera.

5. Plasma arc welding apparatus as recited in claim 1, wherein said light generating means comprises a strobe light generating light of a wavelength different from that of said arc.

* * * * *